(12) United States Patent
Santavicca et al.

(10) Patent No.: US 10,075,819 B2
(45) Date of Patent: Sep. 11, 2018

(54) SYSTEM AND METHOD FOR MICRO-LOCATING AND COMMUNICATING WITH A PORTABLE VEHICLE CONTROL DEVICE

(71) Applicant: VOXX INTERNATIONAL CORPORATION, Hauppauge, NY (US)

(72) Inventors: Joseph Anthony Santavicca, Macomb, MI (US); Tristen Kyle Pierson, Rochester, MI (US); Benson James Brady, Detroit, MI (US)

(73) Assignee: VOXX INTERNATIONAL CORPORATION, Hauppauge, NY (US)

( * ) Notice: Subject to any disclaimer, the term of this patent is extended or adjusted under 35 U.S.C. 154(b) by 0 days.

(21) Appl. No.: 15/290,120

(22) Filed: Oct. 11, 2016

(65) Prior Publication Data
US 2017/0105101 A1    Apr. 13, 2017

Related U.S. Application Data

(60) Provisional application No. 62/239,080, filed on Oct. 8, 2015.

(51) Int. Cl.
*H04W 4/46* (2018.01)
*H04H 20/38* (2008.01)
(Continued)

(52) U.S. Cl.
CPC ............ *H04W 4/046* (2013.01); *H04B 17/27* (2015.01); *H04B 17/318* (2015.01);
(Continued)

(58) Field of Classification Search
CPC ........... H04M 1/7253; H04M 2250/02; H04M 1/6075; H04M 1/6083; H04M 1/6091;
(Continued)

(56) References Cited

U.S. PATENT DOCUMENTS

| | | | |
|---|---|---|---|
| 6,236,365 B1 * | 5/2001 | LeBlanc | G01C 21/206 342/457 |
| 7,973,657 B2 * | 7/2011 | Ayed | G08B 13/1427 340/539.11 |

(Continued)

OTHER PUBLICATIONS

International Search Report dated Jan. 9, 2017 for corresponding application PCT/US16/56407.

(Continued)

*Primary Examiner* — Sharad Rampuria
(74) *Attorney, Agent, or Firm* — F. Chau & Associates, LLC

(57) ABSTRACT

A system for micro-locating a portable device including: a plurality of proximity sensors disposed within a vehicle, wherein the proximity sensors are disposed at different locations from each other, and wherein the proximity sensors are each configured to broadcast a signal; a portable device configured to receive the signals broadcast from the proximity sensors to determine its location with respect to the vehicle; and a control module disposed within the vehicle and configured to enable or disable vehicle control features of the portable device based on the location of the portable device.

20 Claims, 4 Drawing Sheets

(51) Int. Cl.
    *H04W 4/04*     (2009.01)
    *H04W 4/02*     (2018.01)
    *H04B 17/318*   (2015.01)
    *H04B 17/27*    (2015.01)
    *H04W 4/80*     (2018.01)
    *H04W 88/02*    (2009.01)
(52) U.S. Cl.
    CPC ............. *H04W 4/023* (2013.01); *H04W 4/80* (2018.02); *H04W 88/02* (2013.01)
(58) Field of Classification Search
    CPC ..... H04W 84/18; H04W 76/02; H04W 88/06; H04W 8/005; B60R 11/0241; B60R 2011/0005; B60R 2011/0071; H04B 1/3877; H04B 5/00; H04B 5/0012; H04B 5/02; G06K 19/0723; G06K 7/0008; H04R 2420/07
    See application file for complete search history.

(56) References Cited

U.S. PATENT DOCUMENTS

| | | | |
|---|---|---|---|
| 2008/0014867 A1* | 1/2008 | Finn | G06K 7/0008 455/41.1 |
| 2011/0093161 A1 | 4/2011 | Zhou et al. | |
| 2012/0135711 A1* | 5/2012 | Jabara | H04L 63/0876 455/411 |
| 2012/0149341 A1* | 6/2012 | Tadayon | H04B 5/0062 455/412.1 |
| 2013/0288692 A1* | 10/2013 | Dupray | G01C 21/206 455/450 |
| 2013/0324081 A1* | 12/2013 | Gargi | H04M 1/67 455/411 |
| 2014/0164559 A1 | 6/2014 | Demeniuk | |
| 2014/0188348 A1* | 7/2014 | Gautama | B60W 10/30 701/48 |
| 2015/0235486 A1 | 8/2015 | Ellis et al. | |
| 2015/0269638 A1 | 9/2015 | Chatterton et al. | |
| 2016/0127874 A1* | 5/2016 | Kingsmill | H04W 4/80 455/456.1 |

OTHER PUBLICATIONS

Written Opinion dated Jan. 9, 2017 for corresponding application PCT/US16/56407.

International Preliminary Report on Patentability dated Dec. 15, 2017 in corresponding international Application No. PCT/US16/56407.

* cited by examiner

SYSTEM AND METHOD FOR MICRO-LOCATING AND COMMUNICATING WITH A PORTABLE VEHICLE CONTROL DEVICE

CROSS-REFERENCE TO RELATED APPLICATION

This application claims priority under 35 U.S.C. § 119/120 to U.S. provisional application No. 62/239,080, filed on Oct. 8, 2015 in the U.S. Patent and Trademark Office, the disclosure of which is incorporated by reference herein in its entirety.

1. Technical Field

The present invention relates to micro-location technology, and more particularly, to micro-locating and communicating with a portable vehicle control device.

2. Discussion of the Related Art

In vehicle applications, a smart key allows a driver to keep a key fob pocketed when unlocking, locking and starting a vehicle. For example, the key is identified via one of several antennas in the car's bodywork and a radio pulse generator in the key's housing. Depending on the system, the vehicle is automatically unlocked when a button or sensor on the door handle or trunk release is pressed.

Vehicles with a smart key system can disengage the immobilizer and activate the ignition without inserting a key in the ignition, provided the driver has the key inside the car. On most vehicles, this is done by pressing a starter button.

When leaving a vehicle equipped with a smart key system, the vehicle is locked by either pressing a button on one of the door handles, touching a capacitive area on a door handle, or by walking away from a vehicle.

Some vehicles automatically adjust settings based on the smart key used to unlock the car. Such settings may include user preferences such as seat positions, steering wheel position, exterior mirror settings, climate control settings, and stereo presets. Some vehicle models have settings that can prevent the vehicle from exceeding a maximum speed when a certain key is used for starting.

Portable devices, such as smartphones, as well as smartphone applications (or programs running on the portable devices), have become nearly ubiquitous. Smartphone applications have been developed to give smartphones the functionality of a key fob. For example, a smartphone with the appropriate software application can be used in place of an electronic key fob to lock and unlock doors, control a car find feature (e.g., audible horn honk), start a vehicle remotely, or program auxiliary outputs (like trunk release).

Smartphone applications have been developed to receive vehicle information via two-way interfaces connected to a vehicle's OBDII port. OBD may stand for On-board diagnostics. Such a smartphone application can be used to ask for reports that score driver habits for aid in safety coaching, conserving fuel and reducing insurance rates, track vehicle location and help authorities locate the car if it is stolen. Instant alerts can be sent to the smartphone when drivers exceed pre-set geofence boundaries. In addition, the smartphone application can be used to request diagnostic reports on vehicle health and preventative maintenance for tires, brakes, shocks and more.

Smartphone applications may utilize existing communication interfaces in the smartphone and the vehicle. However, these interfaces may not be configured to detect the precise location of the smartphone.

SUMMARY

In an exemplary embodiment of the present invention, a system for micro-locating a portable device includes: a plurality of proximity sensors disposed within a vehicle, wherein the proximity sensors are disposed at different locations from each other, and wherein the proximity sensors are each configured to broadcast a signal; a portable device configured to receive the signals broadcast from the proximity sensors to determine its location with respect to the vehicle; and a control module disposed within the vehicle and configured to enable or disable vehicle control features of the portable device based on the location of the portable device.

The proximity sensors are further configured to provide the location of the portable device to the control module.

The portable device is further configured to provide its location to the control module.

The proximity sensor is a Bluetooth beacon.

The portable control device is a smartphone, a key fob, or a wallet card.

The proximity sensors are further configured to communicate with each other to establish at least one zone in the vehicle, and when the portable device enters the at least one zone, it is permitted full or limited functionality.

Borders of the at least one zone are defined by received signal strength indicator (RSSI) values.

When the at least one zone corresponds to a driver's seat of the vehicle, a texting feature of the portable device is disabled.

When the portable device is in close proximity to an infotainment system of the vehicle, a pairing process is initiated between these two devices.

The proximity sensors form a network and when one of the proximity sensors drops out of the network, the control module is configured to provide an alarm indication to the portable device.

At least one of the proximity sensors is a wheel sensor.

At least one of the proximity sensors monitors a vehicle function.

The control module is communicably coupled to the proximity sensors.

In an exemplary embodiment of the present invention, a system for micro-locating a portable device includes: a mobile device; and a plurality of beacons disposed within a vehicle, wherein the beacons are disposed at different locations from each other, wherein the beacons are communicably coupled to each other to form a beacon frame, wherein at least one zone is defined in the beacon frame by RSSI values of the beacons, and when the mobile device is in the beacon frame, a signal strength between the mobile device and each of the beacons is measured to determine if the mobile device is within the at least one zone, and if the mobile device is determined to be within the at least one zone, the mobile device is permitted full functionality or limited functionality in the at least one zone.

The mobile device is a smartphone, a key fob, or a wallet card.

The mobile device is not permitted to operate its texting feature or video chat feature when the mobile device is in the at least one zone.

The at least one zone corresponds to a driver's seat of the vehicle.

The beacons are Bluetooth beacons.

Personal preferences are set according to the mobile device's identification and location within the vehicle.

The vehicle functions are controlled using signal strength hysteresis of the mobile device.

DETAILED DESCRIPTION OF EXEMPLARY EMBODIMENTS

In accordance with an exemplary embodiment of the preset invention, there is provided a system and method for micro-locating and communicating with a portable vehicle control device.

Through use of micro-location, a portable vehicle control device, such as a smartphone, can have its location precisely detected relative to a vehicle. This way, if a smartphone is detected inside a vehicle, the smartphone may be enabled to start the vehicle. In addition, if the smartphone is detected inside the vehicle and the smartphone is in the driver's seat, the smartphone's texting feature may be disabled. Further, if the smartphone is detected outside the vehicle near the vehicle's trunk, automatic opening of the trunk/liftgate may be facilitated.

Micro-location technology enables a smartphone's location to be accurately detected under one meter. In one example micro-location technology, a plurality of Bluetooth low energy (BLE) beacons may be positioned within a vehicle. These beacons are small transmitters whose signals can be detected by smartphones and tablets. To receive beacon transmissions, a software application is installed on the smartphone or tablet. The application uses the transmitted BLE signal to estimate its proximity to a beacon. This enables the delivery of relevant content in the right physical space, at the right time.

Figure 1:
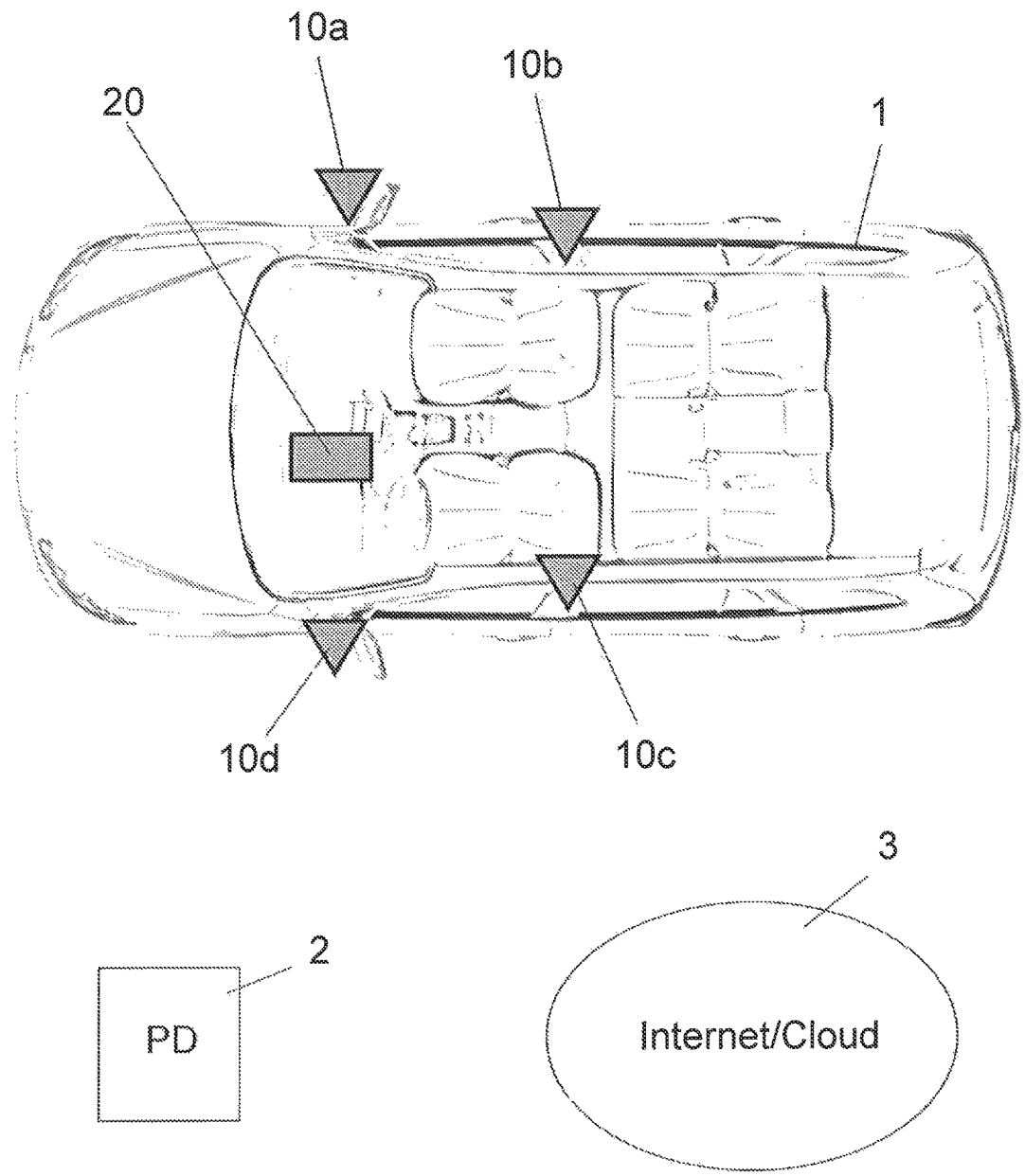
FIG. 1 illustrates a system according to an exemplary embodiment of the present invention.

FIG. 1 illustrates a system according to an exemplary embodiment of the present invention in which BLE micro-location is used to locate and communicate with a portable device. It is to be understood, however, that other micro-location technologies may be used such as WiFi, Quick Response (QR) codes, Zigbee and ANT (ANT is a proprietary open access multicast wireless sensor network technology). It is to be further understood that BLE micro-location can be used with a number of mobile operating systems including Android and iOS.

Referring now to FIG. 1, there is shown a vehicle control system that includes a vehicle 1, a portable device 2 and internet 3.

The portable device 2 may be a smartphone capable of running one or more smartphone applications, and being carried by a user. The portable device 2 may include a control unit and one or more transceivers capable of wireless communication, including, for example, a BLE transceiver and a cellular transceiver. It should be understood that the portable device 2 is not limited to a smartphone, and that the portable device 2 may be any type of device carried by a user and separable from a vehicle, including, for example, a tablet or a key fob.

The portable device 2 may communicate with the internet 3 via its cellular transceiver. A variety of mobile telecommunication protocols may be employed by the portable device 2. These may include Global System for Mobile Communications (GSM) and Code Division Multiple Access (CDMA).

The vehicle 1 may include a plurality of BLE proximity sensors 10a to 10d and a BLE control module 20. The BLE proximity sensors 10a to 10d may be "Bluetooth beacons." A Bluetooth beacon is a transmitter that uses BLE to broadcast a signal that can be heard by compatible or smart devices. These transmitters can be powered by batteries or a fixed power source such as a Universal Serial Bus (USB) adapter. When a smart device is in a beacon's proximity, the beacon will automatically recognize the smart device and will interact with the smart device.

For example, as shown in FIG. 1, the BLE proximity sensors 10a to 10d are capable of transmitting signals to one or more transceivers of the portable device 2. For example, the BLE proximity sensors 10a to 10d may be configured to transmit signals to a BLE transceiver of the portable device 2. As described herein, based on the communication signal from the one or more of the BLE proximity sensors 10a to 10d, the portable device 2 may determine location information about itself.

The BLE proximity sensors 10a to 10d can further communicate with each other. As an example, they may exchange security data indicating they are part of the same system and authorized to communicate with other system components. In yet another example, they may communicate signal strength coming from the portable device 2 as well as a time stamp of the signal coming from the portable device 2.

The BLE control module 20 may communicate with the BLE proximity sensors 10a to 10d. This communication may be via a wired or wireless interface. For example, the BLE control module 20 and the BLE proximity sensors 10a to 10d may communicate over a vehicle bus such as a Controller Area Network (CAN) bus. The BLE control module 20 may communicate with a vehicle control system via the vehicle bus. For example, in response to the portable device 2, the BLE control module 20 may instruct the vehicle system to lock or unlock a door of the vehicle 1.

The BLE control module 20 can communicate with the BLE proximity sensors 10a to 10d to control behavioral patterns and/or operating modes thereof. As an example, the BLE control module 20 can instruct the BLE proximity sensors 10a to 10d to operate, for how long to operate, at which frequency to operate, etc. In yet another example, the BLE control module 20 can instruct the BLE proximity sensors 10a to 10d when to power up, when to power down or when to run according to a schedule.

The BLE proximity sensors 10a to 10d may be disposed at various locations on the vehicle 1. Example locations include rearview exterior mirrors, and upper and/or lower portions of the doors, the rear bumper or a combination thereof. As shown in FIG. 1, the BLE control module 20 is disposed in the vehicle dash, two BLE proximity sensors 10a and 10d are disposed in the rearview exterior mirrors and two BLE proximity sensors 10b and 10c are disposed at mid-portions of the passenger and driver side doors. It should be understood, however, that the embodiments described herein are not limited to this configuration, and that the BLE control module 20 and the BLE proximity sensors 10a to 10d may be disposed anywhere in the vehicle 1.

Figure 2:
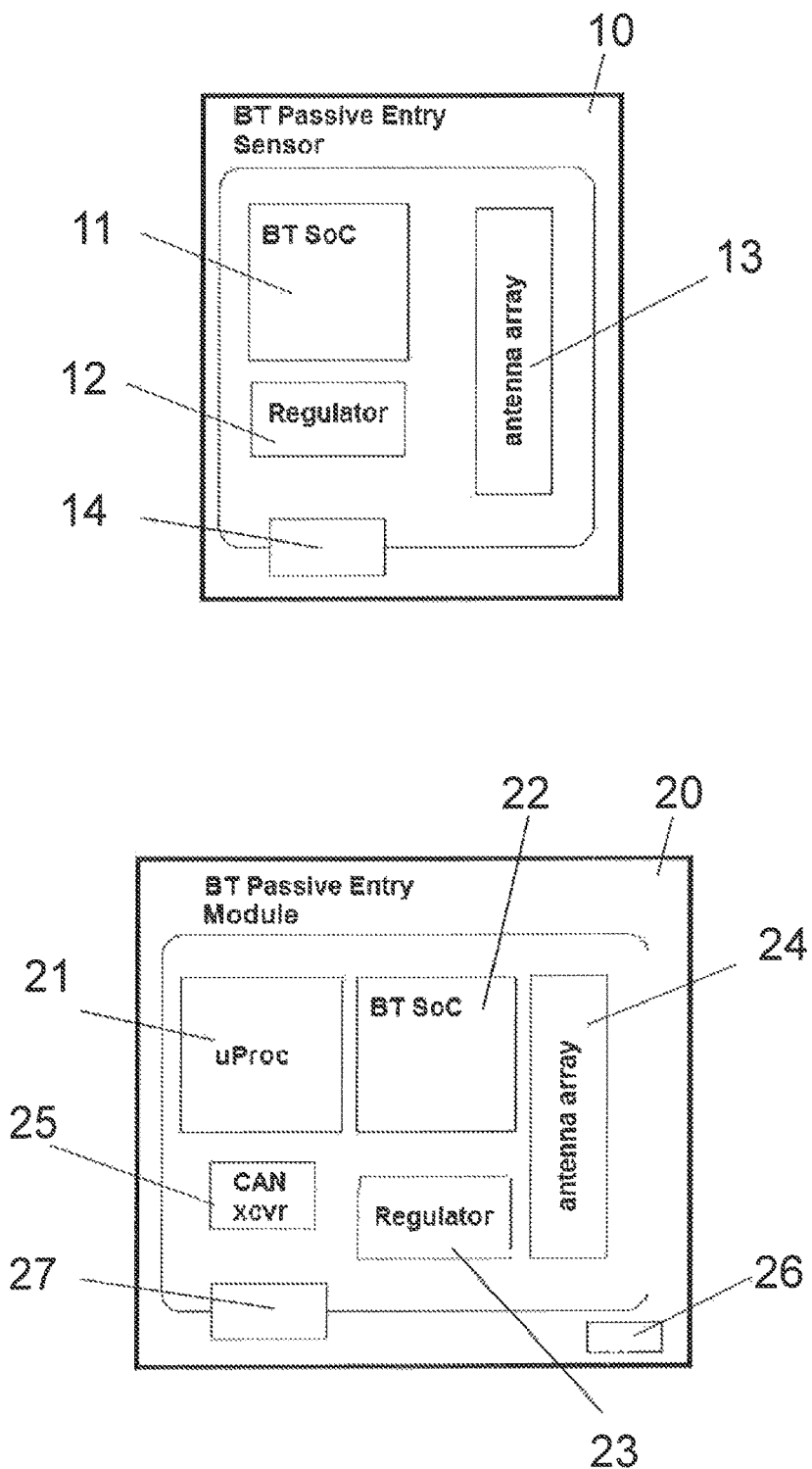
FIG. 2 illustrates a Bluetooth passive entry sensor and a Bluetooth passive entry module included in the system of FIG. 1 according to an exemplary embodiment of the present invention.

FIG. 2 illustrates a BLE proximity sensor 10 (BT Passive Entry Sensor) and a BLE control module 20 (BT Passive Entry Module) in more detail. As shown in FIG. 2, the BLE proximity sensor 10 includes a BT system-on-chip 11, a voltage regulator 12, antenna array 13 and a connector 14. The BLE control module 20 includes a microprocessor 21, a BT system-on-chip 22, a voltage regulator 23, antenna array 24, a CAN transceiver 25, a general-purpose input/output (GPIO) 26 and a connector 27.

The BT system-on-chip 11 of the BLE proximity sensor 10 enables BLE master and slave nodes to be built and includes a radio frequency (RF) transceiver with a software integrated development environment, in-system programmable flash memory and other peripherals to interface with a wide range of sensors, etc. The connecter 14 of the BLE proximity sensor 10 may be used to connect the BLE proximity sensor 10 to the vehicle's power supply.

The BT system-on-chip 22 of the BLE control module 20 may operate similar to the BT system-on-chip 11 of the BLE proximity sensor 10. The connecter 27 of the BLE control module 20 may be used to connect the BLE control module 20 to the vehicle's power supply. The GPIO 26 of the BLE control module 20 may be used to hardwire the BLE control module 20 to the vehicle's electrical system. The CAN transceiver 25 of the BLE control module 20 allows the microprocessor 21 of the BLE control module 20 to communicate with the vehicle's electrical system through a CAN bus.

Referring now to FIGS. 1 and 2, in an exemplary embodiment of the present invention, the BLE control module 20 may use its antenna array 24 to communicate with the BLE transceiver of the portable device 2. The antenna array 24 may be a directional or omnidirectional antenna. The BLE control module 20 may establish a BLE connection between itself and the portable device 2, thereby allowing the portable device 2 to communicate with the BLE control module 20 when in proximity to the vehicle 1. Such communication will be authorized once the portable device 2 is authenticated by the BLE control module 20.

The BLE proximity sensor 10c may use its antenna array 13, such as a directional antenna aimed tower the driver seat, to determine where the portable device 2 is located. For example, if the portable device 2 is located outside the vehicle 1, the signal strength between BLE proximity sensor 10c and the portable device 2 may be low. If the portable device 2 is located in the rear sear of the vehicle 1, the signal strength between the BLE proximity sensor 10c and the portable device 2 may be low. If the portable device 2 is located in the driver seat, the signal strength between the BLE proximity sensor 10c and the portable device 2 may be high. Based on the signal strength, the portable device 2 may be able to determine its location, such as whether or not it is in or near the driver seat.

For enhanced accuracy, each of the BLE proximity sensors 10a to 10d may transmit a signal to the portable device 2. Based on a combination of the strength of these signals, the portable device 2 may determine precise location information about itself. For example, if the signals received from the BLE proximity sensors 10 disposed outside the vehicle 1 are weaker than the signals received from the BLE proximity sensors 10 disposed outside the vehicle 1, the portable device 2 may know it is inside the vehicle 1. Further, if the signal received from a BLE proximity sensor 10 disposed in the driver side door is stronger than the signals received from the BLE proximity sensors 10 disposed in the front passenger and rear passenger doors, the portable device 2 may know it is in the driver seat.

Each of the BLE proximity sensors 10a to 10d may transmit a Bluetooth discovery signal and/or a received signal strength indicator (RSSI) signal to the portable device 2. These signals may be repeatedly transmitted.

A control unit of the portable device 2 may monitor the signal strength (RSSI data) received from each of the BLE proximity sensors 10a to 10d. Based on the monitored signal strength, the control unit determines if the portable device 2 is located in close proximity to the vehicle 1 for unlocking or within the front part of the vehicle 1 for starting the vehicle 1. It should be understood that the portable device 2 may determine its location in a variety of ways.

For example, the control unit of the portable device 2 may determine the location of the portable device 2 based on whether the signal strength of the BLE proximity sensors 10a to 10d exceeds a threshold. For example, if the signal strength of the BLE proximity sensor 10a is above the threshold, the portable device 2 may know it is near the BLE proximity sensor 10a. Further, if the signal strength of the BLE proximity sensor 10b is below the threshold and the signal strength of the BLE proximity sensor 10a is above the threshold, the control unit may know with more accuracy that the portable device 2 is located near the BLE proximity sensor 10a. The strengths of the signal received from the BLE proximity sensors 10a to 10d may be sent to the BLE control module 20.

The BLE control module 20 may include a software algorithm stored on its memory and operable using its microprocessor 21 to enable the BLE control module 20 to know where the portable device 2 is based on signals received from the portable device 2. For example, based on the signal strength of a communication received from the portable device 2, the BLE control module 20 may know if the portable device 2 is inside the vehicle 1 or outside the vehicle 2. The algorithm may also know the current state of a variety of vehicle features. For example, whether the vehicle's doors are locked or unlocked. In this case, if someone in possession of the portable device 2 is within a predetermined range of the vehicle 1 and this information is provided to the BLE control module 20, the currently locked doors may be automatically unlocked. If someone in possession of the portable device 2 is outside another predetermined range of the vehicle 1 and this information is provided to the BLE control module 20, the currently unlocked doors may be automatically locked. In other words, passive entry features may be accomplished.

It is to be understood that when a door is automatically unlocked, in some cases, the door may be opened without the vehicle owner having to make physical contact with the door. For example, the door may seamlessly open as the vehicle owner crosses a predetermined distance threshold with respect to the vehicle. It is to be further understood that the door may not be fully opened, just partially opened, so that the door does not touch a vehicle parked nearby.

For example, when a person with the portable device 2 is more than 30 feet from the vehicle 1, the vehicle's doors may be locked. When the person with the portable device 2 is within 10 feet from the vehicle 1, the vehicle's doors may be unlocked. The distances used for locking and unlocking the vehicle's doors may be based on a threshold of signal strength and may incorporate a time delay.

For example, a radio frequency integrated circuit included in the portable device 2 reports an RSSI that can be used for understanding absolute power levels of a received transmission (or noise). The RSSI can be used to approximate a distance between the transmitter and the receiver with several assumptions such as the transmitter power and antenna gains. The distances assume a certain path loss based on distance and interference or attenuating factors. A large number of variables can change path loss in real time; thus, RSSI is used as a rough indicator when one receiver and one transmitter are used. In other words, RSSI is used to judge a distance between two devices.

In accordance with an exemplary embodiment of the present invention, hysteresis of the RSSI signal can be used to prevent the system from locking and unlocking multiple times as a user approaches a trigger threshold. For example, a single trigger threshold may be crossed with almost no motion of the user due to variation in signal strength just above or below the threshold. To prevent this, the hysteresis may be set with a reasonably large gap so that once transition from lock to unlock has occurred (as an example), a much smaller signal threshold may be set to transition again from unlock to lock. The smaller signal may represent a farther distance. In addition, a wait time may be set after the first threshold transition before checking the signal again. Further, a wait time may be set after the second threshold transition.

Figure 3:
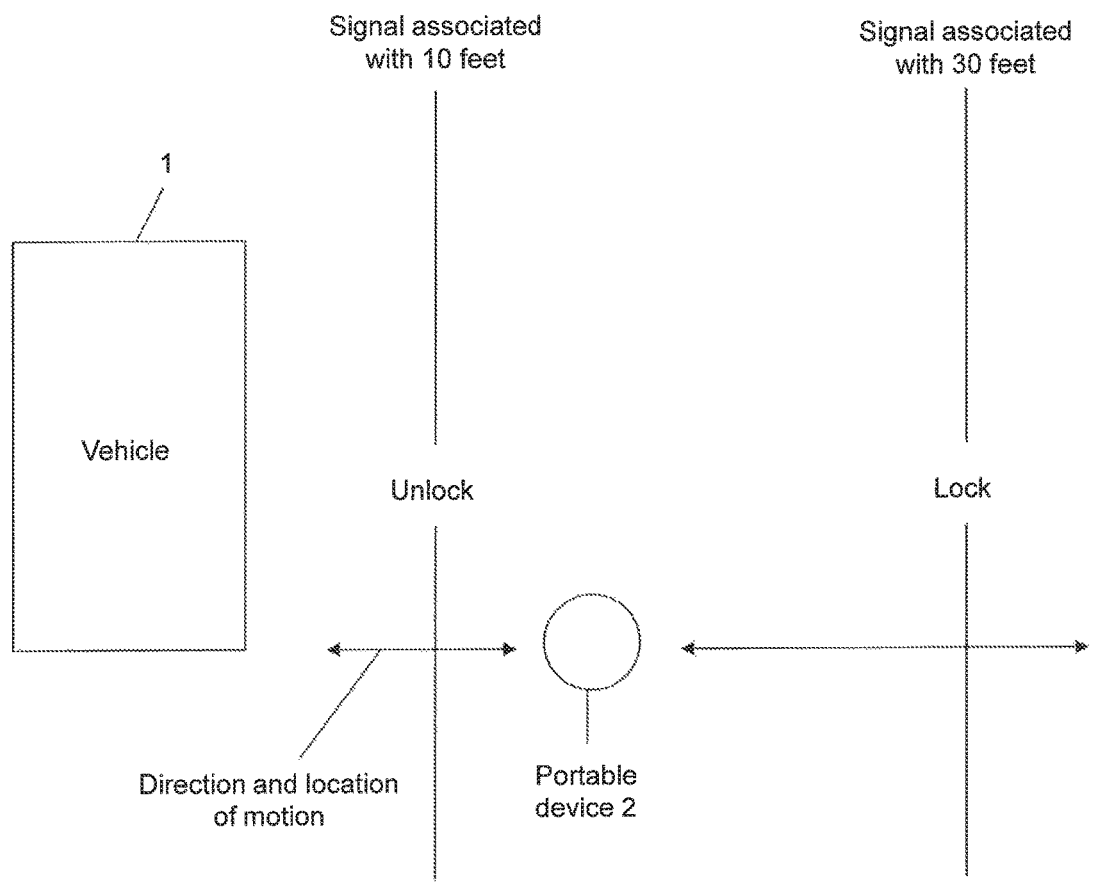
FIG. 3 illustrates using hysteresis of a received signal strength indicator (RSSI) signal to prevent vehicle doors from locking and unlocking multiple times as a user approaches a threshold according to an exemplary embodiment of the present invention.

For example, as shown in FIG. 3, the system of the vehicle 1 will unlock when the user (e.g., portable device 2) approaches and reaches an inner threshold (e.g., ~10 ft). The system will not re-lock unless an outer threshold (e.g., ~30 ft) is exceeded and the user stays past the outer threshold for a period of time (e.g., 3-5 sec).

In an exemplary embodiment of the present invention, the portable device 2 can have certain features disabled through use of micro-location. For example, when the portable device 2 is a smartphone, its texting feature can be disabled. For example, when the smartphone is detected through micro-location as being in the driver's seat, the phone's texting feature may be disabled. It is to be understood that other phone features can be disabled. For example, videotelephony technologies such as facetime may be disabled. It is to be further understood that phone feature disabling is not limited to the driver seat and be can adjusted to include phones present in the front row of a car or anywhere else in a car.

To accomplish this, an app running on the smartphone will communicate RSSI levels between the BLE proximity sensors 10 and calculate its location compared to a frame (either a centroid or node). This information can be compared to established thresholds referenced by the frame to establish zones to allow or disallow mobile device functions such as texting.

Figure 4:
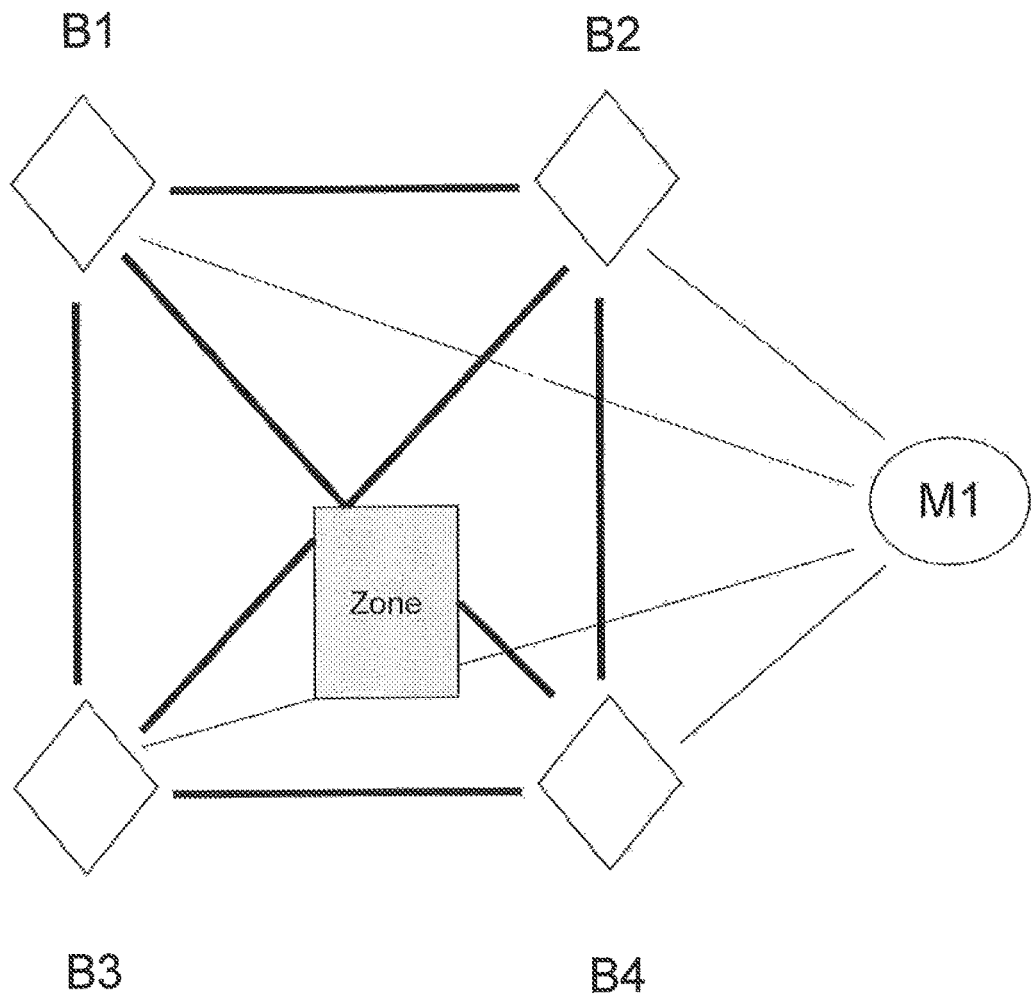
FIG. 4 illustrates micro-locating by checking RSSI against all devices in a cycle according to an exemplary embodiment of the present invention.

For example, as shown in FIG. 4, micro-location can be achieved by checking RSSI against all devices in a cycle. B1 to B4 represent beacons in a vehicle and M1 represents a mobile device. Dark lines between the beacons B1 to B4 represent a beacon frame. A frame is established when the beacons B1 to B4 are communicably coupled to each other to form a network. In this case, the dark lines between the beacons B1 to B4 represent a communication channel between the beacons B1 to B4. To accomplish this, the beacons B1 to B4 establish signal strengths between neighbors. This way, variations within the frame can be detected.

Using the communicably coupled beacons B1 to B4, a zone Zone can be established. The zone Zone is threshold based. For example, the edges of the zone Zone can be defined by RSSI values with respect to the beacons B1 to B4. For example, the lower edge of the zone Zone would have strong RSSI values with B4 and B3, while have weak RSSI values with B1 and B2. The upper edge of the zone Zone would also have strong RSSI values with B4 and B2, but these values would not be as strong as the RSSI values of the lower edge of the zone Zone. More than one zone can be created.

When the mobile device M1 is brought into the frame, it can be determined whether the mobile device M1 is within the zone Zone. For example, signal strength between the mobile device M1 and each of the beacons B1 to B4 can be measured. The mobile device M1 can then be located against a centroid of the frame using triangulation techniques. The mobile device's location can then be checked against the boundaries of the zone Zone. If in the zone Zone, the mobile device M1 can be permitted full functionality (yes text) or limited functionality (no text).

It is to be understood that zones can also be established by estimation using reference mobile devices at the time of system design and placed into software as a set of calibrations. Zones can also be established by a training process at the time the mobile device is programmed (paired) to the beacon frame. Training can be a refinement of pre-established zones.

In an exemplary embodiment of the present invention, micro-location may be used to facilitate Bluetooth pairing to a vehicle's infotainment system. For example, when a smartphone is in close proximity to an infotainment display in a vehicle, the Bluetooth pairing process is initiated between these two devices. This way, the smartphone can control the infotainment system without having to perform a cumbersome pairing process with the entire vehicle control system. To accomplish this, a zone can be established near the vehicle's radio to indicate a function button is to be pressed to accept a pairing request (as an example).

In an exemplary embodiment of the present invention, micro-location can also be used to determine whether a person is standing at the back of the vehicle to facilitate automatic opening of the trunk/liftgate. In this case, a zone would be located near the rear of the vehicle.

In an exemplary embodiment of the present invention, a coin cell battery powered back-up wallet card that allows a user to access the vehicle if the smartphone is lost/stolen/dead battery can be provided. The wallet card would still allow the user to unlock and start the vehicle. In this case, the mobile device is replaced by a hardware device such as a keyfob or wallet card that contains a BT radio, microcontroller and firmware that operates like the app described above.

In an exemplary embodiment of the present invention, Bluetooth tire pressure monitor sensors (TPMS) paired to a vehicle that also add security protection to wheels may be provided. For example, if wheels are removed while the security system is armed, then the alarm will be triggered.

For example, the wheel sensors may be configured to act as part of the beacon frame (the frame does not have to be made by four BT devices). In this case, an alert or alarm trigger can be set if one of the beacons stops functioning or drops out of the network. The beacons may also be defined by type and alert levels can be set based on type. For example, some types may cause an alarm trigger, while others may not. Further, alerts may be of different forms such as a text message.

In addition, rather than defining the wheel sensors as part of the beacon frame, the sensors can be defined as additional devices. For example, a smartphone may be defined as a first mobile device, a dongle/key fob may be defined as a second mobile device and the tire sensors may be defined as a third mobile device. The tire sensors may include their own microprocessor, BT transceiver, power, etc. and they may be put inside a tire. For example, the tire sensors may be in a lug nut cap or a tire stem.

In an exemplary embodiment of the present invention, all radio frequency (RF) in the car can be Bluetooth (BT) instead of Ultra-High Frequency (UHF).

In an exemplary embodiment of the present invention, urban mobility features for zipcar and car sharing services are provided. For example, there may be provided a process to share encryption keys to enable car start and unlock based on account credentials managed in a cloud database—pay per use or credit card account, etc. Current systems require a BT connection between the phone and the vehicle. BT connections require the devices be paired before data can flow. In present exemplary embodiment, an app is used to get authorization to pair with the vehicle prior to initiating pair or it will block access. Additionally the pairing process can be simplified and be accessible when the vehicle is off and the user is outside the vehicle. In this case, an NFC antenna can be mounted on the inside of a window surface that will active the BT pairing process and share pairing data via the Near Field Communication (NFC) channel. In another case, the vehicle can have a telematics module that is in communication with the cloud service along with the phone. The BT pairing data will flow between the vehicle and phone via the internet on a secure channel brokered by the cloud service.

To enable vehicle access via BT, an exemplary authorization process is as follows:

1. The service provider preprograms a unique vehicle access key for each vehicle before end user check out. Each vehicle will have one or more identifier constant(s): UUID, Bluetooth Address, and VIN. Each record in the cloud database will include the aforementioned identifier constants as well as the preprogrammed vehicle access key. This record data is referred to as vehicle access information.
2. Via mobile app, the end user checks out a vehicle after payment. The mobile app will access the cloud service to download and store vehicle access information used for BT link pairing via SSP (Secure Simple Pairing).
3. If a vehicle is unpaired, it will be advertise the vehicle identifier(s) and wait for connections on a schedule. The mobile app will attempt pairing when the end user attempts to access the vehicle.
4. If a vehicle is already paired, it will connect to the mobile device if within BT range.
5. Once paired, the end user has full access to the feature set.
6. During vehicle check in, the BT link is unpaired and the vehicle access key is removed from the mobile app. The service provider then connects to the vehicle in order to create a new vehicle access key and remove any end user Bluetooth pairing profiles.

In an exemplary embodiment of the present invention, there is provided a low current BT pinging scheme. For example, polling may be put on a schedule, a ping schedule may be based on last access to the vehicle, and adaptive scheduling may be based on location, time of day (e.g., google staking—going to work, coming home from work, shopping). For example, BT beacons advertise on a schedule every 5-10 seconds. The schedule can be made longer or shorter. For example, between 6 am car is frequently used, therefore, up the ping rate.

In an exemplary embodiment of the present invention, there is provided a link to a biometric (e.g., eyelock) which adds security for authentication to start a vehicle, authentication to share a vehicle, or login. In this case, through use of biometric identification, only certain people can pair a phone, allow a car to start if a phone battery is dead or a phone won't authenticate for some reason. Biometric identification can also be used for personalized feature controls like memory seat, radio preset, mirror location, teenage restrictions—speed limit, radio volume, geofence zone settings/alerts, for example. In addition, biometric identification can be used for True Driver ID for insurance & Customer Relationship Management (CRM) services, as well as providing features such as tracking and speed alerts—sent through the phone data channel, drowsiness detection and alerts, under-the-influence detection. For example, teen driving over 70 mph, text sent to parent's phone.

In an exemplary embodiment of the present invention, eye dilation reaction time is delayed when a person is under the influence of alcohol. Using internal eyelock system in rear view mirror, eyelock can do under the influence detection method (e.g., detect rate of eye dilation) using flashing light in mirror to cause pupil to dilate. When rate dilation exceeds an under the influence threshold, the car may be prevented from being started.

In an exemplary embodiment of the present invention, there is provided a link to an RF—the RF keypad being used for entry to the vehicle if a phone is dead or lost. In this case, an externally mounted RF keypad can be used to gain entry to the vehicle when a cell phone battery is dead. This allows a user to charge the phone once in the vehicle to allow car start through cell phone authentication. In addition, access to a car can be permitted and authenticated using eyelock, finger print, or another biometric. Further, a thin wallet card with BT chip and battery can be used. This would be used as a spare key to enable vehicle unlock and start in case of dead cell phone battery. A power switch can be used to enable circuitry only when needed to preserve coin cell life (this feature could extend the useful life of a back up dongle or wallet card to near 10 years). NFC can be embedded in the RF keypad to allow for unlock.

In an exemplary embodiment of the present invention, there is provided a link to NFC for initial pairing, using encryption to start and credential sharing. For example, NFC is a secure communication channel that typically requires very low range such a 4 cm or less to couple the signal. In the present embodiment, an NFC antenna can be placed in the vehicle dashboard or nearby and require the phone be placed on the coupling surface to enable it to be used as a secure key. Encryption keys and security data can be communicated via the NFC channel. Certain credential updates such as deactivation or ownership transfer can also be limited to occur only through this process. NFC can be used to initiate BT pairing as opposed to advertising and discovery. This can save power.

In an exemplary embodiment of the present invention, a network mesh using the ANT protocol and involving command signal hopping from vehicle to vehicle as well as data hopping from vehicle to vehicle is provided. In this case, a command signal (lock, remote start, etc.) is tagged with a vehicle address and any vehicle with this equipment will receive the signal and rebroadcast to all other nodes in the mesh within range—the signal would continue to hop until the receiving device finally gets the signal. The signal may be prevented from recirculating and may have an expire—the expire can be a hope count or time limit or both.

In an exemplary embodiment of the present invention, an RF/BLE fob may be yet another peripheral which gives a phone access to controlling remote functions (start, locate, security, etc.) by providing a BT or RF gateway to the vehicle's (RSM).

In an exemplary embodiment of the present invention, if you want to borrow a friend's car, a web service can have a secret key allowing you to borrow the key for two days, for example. The encryption keys are in the cloud. They are sent to your phone assuming you are a member of the web service. The time permitted to use the secret key can be extended. Further, when sharing credentials, functionality can be limited. For example, speed can be limited, trunk access can be denied.

In accordance with an exemplary embodiment of the present invention, by holding phone near radio and turning on BT pairing of the radio, since the phone knows where it is (due to micro-location), the phone will be paired to the radio.

In accordance with an exemplary embodiment of the present invention, there is provided a safety feature to disable the text function on a paired phone when the system determines said phone is in location of the driver seat. For example, if same phone is being held by and located in a passenger seat texting is enabled, as soon as it is moved into the driver seat location, texting is disabled. The safety feature can be activated/deactivated when in dealer lot mode.

In accordance with an exemplary embodiment of the present invention, a smart phone can be utilized instead of or in addition to ACM keypad for preload vehicle security access. This eliminates the need for dealers to purchase ACM keypads and can reduce program costs.

In operation:
Dealer web browser acts as an administration tool to set up users/smart phones and view/print usage reports
Smart phones are used at time of install, during sales demos in lot-mode, and to transition the security product to consumer mode
Smart phones control the vehicle security & RKE systems and transmit the usage activity to the server
Smart phone/users are given access rights by the administrator
(time of day and days of week operation)
All usage transactions are sent to the server
Vehicle ID
Smart phone ID (user)
Operation type (lock, unlock, consumer mode transition, transition type (Red, Green, Yellow, Blue)
Timestamp
The use process is as follows:
User opens smartphone app
App checks with server to verify user access and logs in
User come within range of vehicle to gain access
Possible usage methods to control vehicle
Scan VIN barcode, or barcode sticker
Hold phone to NFC tag (if system configured and equipped)
User presses number sequence keyed to the vehicle ID
Select vehicle from menu list (list populated by all vehicles within bluetooth range)
User presses function key
Lock/unlock/transition
Transaction information is sent via cell network to the sever to create transaction record In accordance with an exemplary embodiment of the present invention, the aforementioned micro-location techniques can be used to set up driver preferences like memory seat, radio presets, climate controls, mirror locations, etc.

In accordance with an exemplary embodiment of the present invention, when the phone is detected in the driver seat area, certain phone features such as Ski and Google voice can be automatically engaged.

In accordance with an exemplary embodiment of the present invention, the micro location algorithm can have multiple hysteresis thresholds depending on location and mode of operation. For example, the algorithm can determine instantaneous location changes within the beacon frame, but actions and feature actuation can have different hysteresis criteria—these criteria would be based on reaction to total distance moved into and out of function zones and also time in and out of the zone as well as rates of movement. Use of the phone's accelerometer may be used in both the feature activation functions and in the location algorithm. As an example, the driver may simply extend their arm (holding phone) to try to defeat the zone texting lockout. This would happen quickly and for a relatively short duration. There can also be an activation feature based on location and motion of the phone such as shake twice to activate Ski if in the driver zone, etc. Or, shake twice to lock the car when around the vehicle after exiting the car.

While the present invention has been particularly shown and described with reference to exemplary embodiments thereof, it will be understood by one of ordinary skill in the art that variations in form and detail may be made thereto without departing from the spirit and scope of the present invention as defined by the attached claims.

What is claimed is:

1. A system for micro-locating a portable device, comprising:
a plurality of proximity sensors disposed within a vehicle, wherein the proximity sensors are disposed at different locations from each other, and wherein the proximity sensors are each configured to broadcast a signal;
a portable device configured to receive the signals broadcast from the proximity sensors to determine its location with respect to the vehicle; and
a control module disposed within the vehicle and configured to enable or disable vehicle control features of the portable device based on the location of the portable device,
wherein the proximity sensors exchange information with each other, the information including signal strength coming from the portable device and a time stamp of the signal coming from the portable device,
wherein the information further includes security data indicating that the proximity sensors are part of the same system and are authorized to communicate with other system components,
wherein the system further includes a Bluetooth tire pressure monitor sensor (TPMS) configured to trigger an alarm when there is an unauthorized attempt to remove at least one of the vehicle's wheels.

2. The system of claim 1, wherein the proximity sensors are further configured to provide the location of the portable device to the control module.

3. The system of claim 1, wherein the portable device is further configured to provide its location to the control module.

4. The system of claim 1, wherein the proximity sensor is a Bluetooth beacon.

5. The system of claim 1, wherein the portable control device is a smartphone, a key fob, or a wallet card.

6. The system of claim 1, wherein the proximity sensors communicate with each other to establish at least one zone in the vehicle, and when the portable device enters the at least one zone, it is permitted full or limited functionality.

7. The system of claim 6, wherein borders of the at least one zone are defined by received signal strength indicator (RSSI) values.

8. The system of claim 6, wherein when the at least one zone corresponds to a driver's seat of the vehicle, a texting feature of the portable device is disabled.

9. The system of claim 1, wherein when the portable device is in close proximity to an infotainment system of the vehicle, a pairing process is initiated between these two devices.

10. The system of claim 1, wherein the proximity sensors form a network and when one of the proximity sensors drops out of the network, the control module is configured to provide an alarm indication to the portable device.

11. The system of claim 10, wherein at least one of the proximity sensors is a wheel sensor.

12. The system of claim 1, wherein at least one of the proximity sensors monitors a vehicle function.

13. The system of claim 1, wherein the control module is communicably coupled to the proximity sensors.

14. A system for micro-locating a portable device, comprising:
   a mobile device; and
   a plurality of beacons disposed within a vehicle, wherein the beacons are disposed at different locations from each other, wherein the beacons are communicably coupled to each other to form a beacon frame, wherein at least one zone is defined in the beacon frame by received signal strength indicator (RSSI) values of the beacons, and when the mobile device is in the beacon frame, a signal strength between the mobile device and each of the beacons is measured to determine if the mobile device is within the at least one zone, and if the mobile device is determined to be within the at least one zone, the mobile device is permitted full functionality or limited functionality in the at least one zone, wherein the beacons exchange information with each other, the information including the signal strength coming from the mobile device and a time stamp of the signal coming from the mobile device,
   wherein the information further includes security data indicating that the beacons are part of the same system and are authorized to communicate with other system components,
   wherein the system further includes a wireless tire pressure monitor sensor (TPMS) configured to trigger an alarm of an armed security system when there is an attempt to remove at least one of the vehicle's wheels.

15. The system of claim 14, wherein the mobile device is a smartphone, a key fob, or a wallet card.

16. The system of claim 15, wherein the mobile device is not permitted to operate its texting feature or video chat feature when the mobile device is in the at least one zone.

17. The system of claim 16, wherein the at least one zone corresponds to a driver's seat of the vehicle.

18. The system of claim 14, wherein the beacons are Bluetooth beacons.

19. The system of claim 14, wherein personal preferences are set according to the mobile device's identification and location within the vehicle.

20. The system of claim 14, wherein the vehicle functions are controlled using signal strength hysteresis of the mobile device.

* * * * *